June 18, 1963
A. J. PIPPERT ETAL
3,094,337
SEAL RING
Filed Oct. 31, 1960
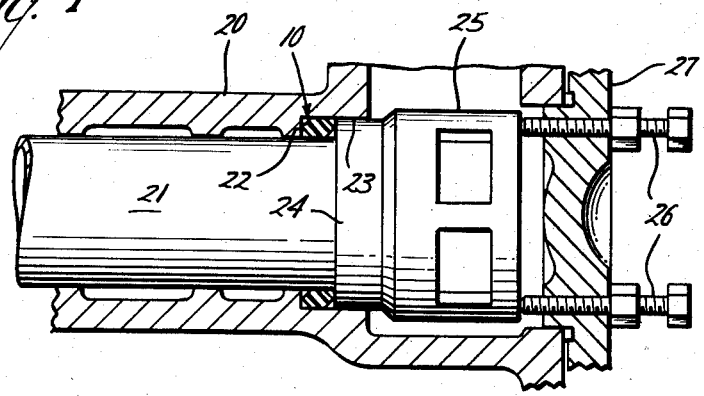
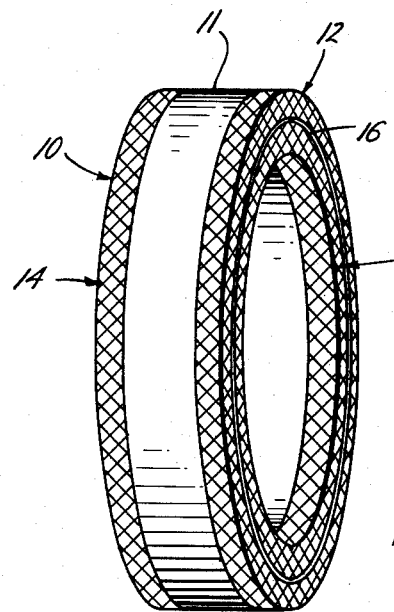
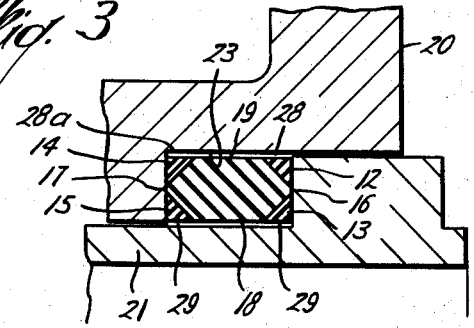
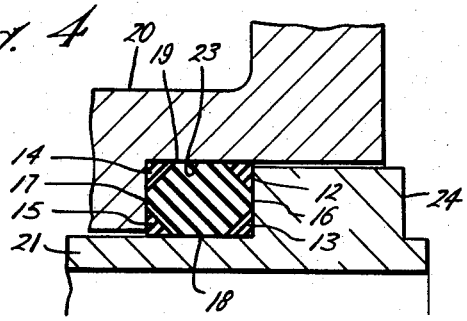
Aaron J. Pippert
E. B. Heathcott
INVENTORS
BY Browning, Simms,
Hyer & Eickenrodt
ATTORNEYS United States Patent Office 3,094,337
Patented June 18, 1963

3,094,337
SEAL RING
Aaron J. Pippert and E. B. Heathcott, Houston, Tex., assignors to Universal Packing & Gasket Company, Houston, Tex.
Filed Oct. 31, 1960, Ser. No. 66,206
2 Claims. (Cl. 277—188)

This invention relates to an improved seal ring of the type having anti-extrusion elements at its ends.

Frequently, it is necessary to provide a seal between opposed concentric cylindrical surfaces. For this purpose, it is common practice to insert an annular mass or ring of a relatively soft sealing material between these sealing surfaces and then deform it radially outwardly and radially inwardly to sealably engage the surfaces by application of an endwise force. It also is common practice to provide these seal rings with relatively hard anti-extrusion elements at their ends for the purpose of preventing extrusion of the relatively soft sealing material of the ring into the cracks or spaces between the adjacent structural elements when the ring is exposed to high pressures. In order to accomplish this purpose, the anti-extrusion elements must be sized to tightly engage the inner and outer sealing surfaces of the structural elements at each end of the sealing material when the ring is in its operative position and must be capable of maintaining this close fit under a wide range of operating conditions. In addition, the seal ring, including the anti-extrusion elements and the sealing material, should be freely removable upon release of the endwise force.

Although these anti-extrusion elements have been provided in a wide variety of materials and configurations, they have many undesirable features and disadvantages which make the seal rings unsuitable for many important applications. For example, it has been found that these presently known anti-extrusion seal rings do not perform satisfactorily as liner seals or cylinder head seals in slush pumps because of the severe conditions, including high pressures, high temperatures, pounding or hammering forces, and the like, to which they are exposed during operation of the pumps. In addition, the liners and counter bores which generally provide the inner and outer confining or sealing surfaces, respectively, for the liner seal ring vary in size, particularly in reconditioned pumps. This presents an additional difficulty in attempting to use presently known anti-extrusion seal rings for this purpose since it is not practical to provide the rings in a sufficient range of sizes to avoid leaving gaps or spaces between the anti-extrusion end elements of the ring and the inner and outer sealing surfaces on the pump when the seal is in operative position. It has been found that the relatively soft sealing material of the seal ring extrudes through these spaces and past the anti-extrusion end elements of the ring, thereby causing the liner seal to fail for this additional reason.

An object of this invention is to provide a seal ring which obviates the foregoing difficulties and disadvantages.

Another object of the invention is to provide an improved anti-extrusion seal ring for use under severe operating conditions including, for example, high pressures, high temperatures and the like and which has a relatively long service life as compared to presently known seal rings of this type.

Another object of the invention is to provide an improved seal ring of the type having relatively hard anti-extrusion elements at its ends and relatively soft sealing material intermediate its ends in which each of said end anti-extrusion elements are constructed so as to be capable of expanding or contracting in a radial direction to closely engage the adjacent surfaces between which the composite ring is to form a seal upon application of an endwise force to the composite ring.

Another object of the invention is to provide an improved composite seal ring for use as a liner seal or a cylinder head seal on a slush pump.

Other objects, advantages and features are inherent and will become apparent upon consideration of the specification, claims and attached drawings.

These and other objects and advantages are accomplished according to this invention by a composite seal ring, including an annular mass of a relatively soft sealing material having a relatively hard anti-extrusion ring mounted at each of its inner and outer end corners. Each of the anti-extrusion rings, while of a material hard and strong enough to prevent its extrusion under pressure, is of an expansible or stretchable thermosetting material, and the several rings are fastened to their respective corners in spaced apart relationship, adapting the anti-extrusion rings, upon application of an endwise force thereto, to be moved toward one another in an axial direction to deform the sealing material therebetween radially inwardly and radially outwardly into sealing engagement with the sealing surfaces on the structural members adjacent to the composite seal ring, and at the same time to be stretched and compressed respectively and thus moved away from one another in a radial direction, radially inwardly and radially outwardly, respectively, a sufficient distance to tightly engage said inner and outer sealing surfaces and thereby confine the relatively soft sealing material against extrusion even when it is exposed to relatively high pressures, high temperatures or other severe operating conditions.

In the drawings, illustrating one form of the invention with which the foregoing objects can be accomplished and wherein like characters are used to designate like parts throughout the several views:

FIG. 1 is a cross sectional view of a seal ring constructed according to this invention and mounted in operative position on a liner in a slush pump;

FIG. 2 is an isometric view of the composite seal ring of this invention;

FIG. 3 is a cross sectional view of the composite seal ring of this invention mounted on a pump liner and showing the position of parts before the endwise force has been applied to the seal ring; and FIG. 4 is a cross sectional view similar to FIG. 3 but showing the position of parts after the endwise force has been applied to the composite seal ring.

Referring now to the drawings and to the form of the invention illustrated therein, the composite seal ring of this invention will be seen to include an annular mass 11 of a soft sealing material such as rubber or the like having relatively hard anti-extrusion rings 12, 13, 14 and 15 mounted at and defining each of its inner and outer end corners. The several anti-extrusion corner rings, which preferably are wedge-shaped in cross section and bonded, molded or otherwise integrally joined to sealing material 11, are spaced apart from one another so as to expose at least a portion of the inner and outer cylindrical surfaces and the annular end surfaces of the sealing material to the structural surfaces confining the seal ring when it is in its operative position. More particularly, the outer and inner anti-extrusion corner rings 12—13 and 14—15, respectively, of each end pair are positioned in radially spaced apart relationship, thereby exposing an annulus 16, 17 of sealing material at each end of the composite seal ring, while the opposed outer anti-extrusion corner rings 12—14 and the opposed inner anti-extrusion corner rings 13—15 are spaced apart axially from one another thereby exposing the sealing material as cylindrical surfaces 18 and 19 along the inner and outer surfaces of the composite seal ring.

Each of anti-extrusion rings 12, 13, 14 and 15 are of a thermosetting material, for example, phenolic resin or the like, which may be reinforced by woven filaments such as a cotton fabric or the like. When reinforcing material is used, the anti-extrusion ring preferably is constructed so that the weave of the reinforcing material, which is impregnated in the thermosetting material, is biased with respect to the plane of the anti-extrusion ring. That is, the filaments or threads of the reinforcing material lie in planes angularly disposed to the plane and circumference of the anti-extrusion ring. With this arrangement, the forces tending to resist the radial expansion of outer anti-extrusion rings 12 and 14 and the radial contraction of inner anti-extrusion rings 13 and 15 are directed on the bias across the weave of the fabric rather than along the individual threads of the fabric. This construction, which is clearly illustrated in FIG. 2, has been found to substantially increase the expansibility and contractibility of the anti-extrusion rings and thereby permits them to expand and contract radially of the composite ring when an endwise force is applied thereto. In FIG. 2 the crisscross lines on the anti-extrusion rings indicate the directions of the threads of the reinforcing fabric as being angularly disposed to the plane and circumference of each anti-extrusion ring so as not to interfere with the radial expansion or contraction thereof, but at the same time to reinforce it against extrusion.

The operation of the composite seal ring of this invention will be described in connection with its use as a liner seal for a slush pump. However, it will be understood that it has utility in other application, particularly in applications in which the ring is exposed to severe operating conditions while in use.

According to conventional practice, the composite seal ring 10 of this invention may be mounted in a recess formed between fluid cylinder 20 and liner 21, the seal being engaged at one end by the shoulder 22 formed in the bottom of packing counter bore 23 and engaged at its other end by liner collar 24. Liner 21 is held in operative position by liner clamp 25 and is moved axially of fluid cylinder 20 to apply the endwise force to composite seal ring 10 by suitable means such as liner set screws 26 which are threadedly received in cylinder head 27.

It will be recalled that the liner 21 and counter bore 23 may vary in size, particularly in reconditioned pumps. As a result of these size variations, there may be relatively large spaces or gaps between the anti-extrusion elements of the seal ring and the inner and outer sealing surfaces on the liner and pump body. This situation is illustrated in FIG. 3 which shows the seal ring of this invention in operative position but before the liner has been tightened down. Because of the above mentioned size variations, the composite seal ring fits loosely between the structural elements of the pump and there are gaps or spaces 28—28a between outer anti-extrusion rings 12—14 and the inner surface of counter bore 23 and also gaps or spaces 29—29a between inner anti-extrusion rings 13—15 and sleeve 21. In the case of presently known seal rings, the sealing material would extrude through these gaps or spaces after the liner has been tightened down and the seal is exposed to pressure.

However, due to the unique construction of the composite seal ring of this invention, the opposed end anti-extrusion rings of the composite seal ring are capable, upon application of an endwise force, of moving toward one another in an axial direction to deform the sealing material radially inwardly and radially outwardly into sealing engagement with the liner and counter bore and at the same time the inner and outer anti-extrusion rings at each end of the seal ring are capable of moving away from one another in a radial direction, both radially inwardly and radially outwardly, a sufficient distance to bridge these gaps or spaces and confine the sealing material against extrusion. This action is illustrated in FIG. 4 which shows the position taken by the seal elements when an endwise force is applied thereto by tightening down the liner.

Since the anti-extrusion rings are of a relatively hard thermosetting material, they will not fail, even under severe operating conditions of pressure, temperature and the like as is the case with presently known anti-extrusion rings. Thus, it will be seen that the composite seal ring of this invention not only is capable of providing superior performance under severe operating conditions as compared to presently known seal rings, but also is capable of expanding in outside dimension and contracting in inside dimension to compensate for variations in the sizes of the structural surfaces adjacent to the ring.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A composite seal ring comprising a tubular body having an annular mass of a relatively soft thermoplastic sealing material intermediate its ends and opposed anti-extrusion elements at each of its ends, each of said end anti-extrusion elements including a pair of concentric radially spaced apart rings molded to said sealing material and defining the inner and outer corners, respectively, of said tubular body, each of said rings being of a fabric reinforced thermosetting material, the weave of said fabric being positioned on a bias with respect to the circumferential extent of the ring so that forces tending to produce expansion and contraction of the rings are directed across all the individual threads of the weave.

2. A composite seal ring for sealing between opposed concentric sealing surfaces comprising a tubular body having an annular mass of a resilient thermoplastic sealing material intermediate its ends and opposed anti-extrusion elements at each of its ends, each of said end anti-extrusion elements including a pair of continuous concentric radially spaced apart rings molded to said sealing material, the inner and outer ring of each end pair defining the inner and outer corners, respectively, of the tubular body and the several rings being of a relatively hard thermosetting material having an elastic nature in tension adapting the several rings, upon application of the endwise force, to be moved toward one another in an axial direction and at the same time to be wedged away from one another in a radial direction to thereby simultaneously increase the outside diameter and decrease the inside diameter of the composite ring, said anti-extrusion rings embodying reinforcing means consisting of a plurality of filaments woven together and impregnated with said thermosetting material, all the filaments of said weave being disposed transversely at various angles with respect to the circumference of said ring.

References Cited in the file of this patent

UNITED STATES PATENTS

| | | |
|---|---|---|
| 1,928,259 | McCabe | Sept. 26, 1933 |
| 2,194,944 | Hubbard | Mar. 26, 1940 |
| 2,308,149 | Bingham | Jan. 12, 1943 |
| 2,676,823 | Olson et al. | Apr. 27, 1954 |
| 2,862,736 | Russell | Dec. 2, 1958 |
| 2,960,332 | Lindow et al. | Nov. 15, 1960 |
| 2,968,516 | Jarvis | Jan. 17, 1961 |

FOREIGN PATENTS

| | | |
|---|---|---|
| 1,193,987 | France | Nov. 5, 1959 |